Feb. 29, 1944. H. E. LAWSON 2,343,194
DRY CELL
Filed Nov. 1, 1940
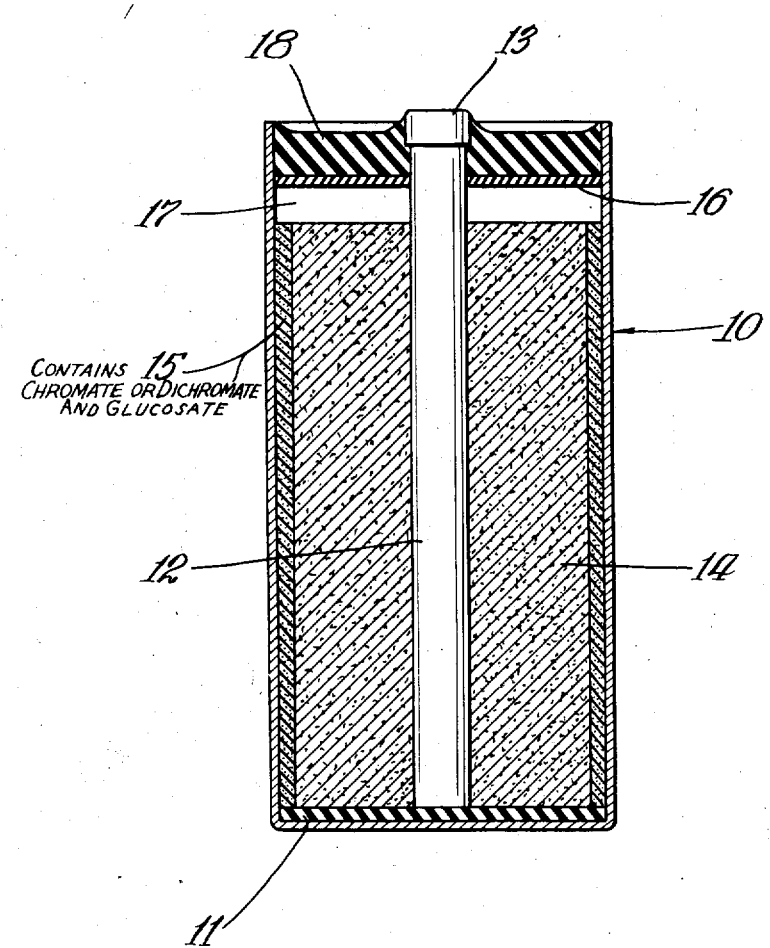
Inventor:
Herbert E. Lawson
By- Jesch and Darbo
Att'ys.

Patented Feb. 29, 1944

2,343,194

UNITED STATES PATENT OFFICE 2,343,194

DRY CELL

Herbert E. Lawson, Chicago, Ill., assignor to Burgess Battery Company, Chicago, Ill., a corporation of Delaware Application November 1, 1940, Serial No. 363,824

5 Claims. (Cl. 136—103)

This invention relates to dry cells, and particularly to improvements in the construction of such dry cells whereby deterioration during periods of storage and inactivity is reduced.

It is the object of the invention to provide a dry cell which has improved "shelf-life" and intermittent drain properties.

Briefly, the object of the invention is effected by applying to the surface of the zinc anode which is exposed to the electrolyte of the dry cell, a compound containing a $CrO_3$ radical, in combination with a compound having a glucoside structure. In accordance with the present invention, it has been discovered that a compound having the $CrO_3$ radical, when in association with a glucoside or a glucosate, is highly effective in inhibiting the corrosion of the zinc anode, which, due to local action or other causes, occurs during periods of inactivity of the dry cell.

The invention will be described in connection with the common cylindrical type of dry cell. The dry cell which is illustrated in the drawing comprises an open-top cylindrical zinc can 10 which is the anode. Upon the bottom of the can is disposed a layer of electrical insulating material 11, which may be a heat-fusible pitch or wax composition, a resin, or a treated fibrous material such as paper board or pulp board, which is resistant to the electrolyte of the cell. A carbon rod cathode 12 is disposed substantially centrally of the zinc can 10 and has a metal cap 13 upon its upper end. The carbon rod is mechanically separated and electrically insulated from the bottom of the can 10 by the insulating layer 11. The carbon rod 12 is surrounded by a moist, compacted mass of depolarizing material 14 which may be composed of powdered manganese dioxide ore, carbon or graphite, ammonium chloride, zinc chloride, water and other well-known ingredients. Between the depolarizing body 14 and the zinc can 10 is a substantially solid layer 15 of electrolyte, which may be composed of the usual electrolyte substances, such as water, starch, usually in gelatinized form, ammonium chloride, zinc chloride, etc. The electrolyte is in the form of a liquid suspension when initially inserted in the can 10 and becomes solidified by gelatinization of the starch. A top washer 16 is arranged in spaced relation above the depolarizing body 14 to form an expansion space 17, and a heat-fusible seal 18, of wax, pitch, or other suitable material, rests upon washer 16 and forms a seal closure for the open top of the can 10.

The specific dry cell described is given by way of example and the invention may be applied to other types of primary cells, such as the flat or plate type, and to cells in which the anode is of a metal other than zinc, such as magnesium, aluminum, etc., and also to cells employing depolarizers other than manganese dioxide, such as copper oxide and lead oxide and electrolytes other than that described heretofore, such as the alkali metal sulfates.

It is not uncommon for dry cells to remain in storage, in the plant or on the dealer's shelf, for a considerable period between the time they are manufactured and the time they are placed in use by the consumer. After they are placed in use, they may be discharged rapidly, or they may be discharged slowly and only intermittently with relatively long periods of inactivity intervening between periods of use. It is highly important, therefore, that a dry cell does not deteriorate and lose its capacity to deliver electric energy during such periods of inactivity. Unless steps are taken to resist such deterioration, it takes place at an appreciable rate, and the dry cell industry has from the beginning striven to overcome this difficulty. This invention provides an improved means for accomplishing the purpose.

It has been known for a long time that chromic acid, or a salt of chromic acid, reduces deterioration of a dry cell during inactivity. This is described in United States Patent No. 1,331,877, dated February 24, 1920. In accordance with the present invention, it has been discovered that the effectiveness of a compound containing a $CrO_3$ radical, such as chromic acid or a salt of chromic acid, is greatly augmented when it is used in association with certain compounds having a glucoside structure. These compounds themselves, in the absence of a compound having a $CrO_3$ radical, do not have any appreciable effect in inhibiting corrosion of the zinc anode during inactivity of the cell. Some of them on the contrary, cause an increase in the corrosion. When they are used in association with a $CrO_3$ radical, however, they have the property of increasing the inhibiting power of the $CrO_3$ radical to a remarkable degree, both before and after the cell is initially placed in use. The combination, however, does not interfere with the free delivery of energy while the cell is in service.

The compounds containing a $CrO_3$ radical which may be used are chromic acid, and its salts, such as the alkali metal (including ammonium), chromates and dichromates, etc. These compounds are water-soluble. The compounds having a glucoside structure which are suitable are beta glucoside,

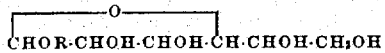
ĊHOR·CHOH·CHOH·ĊH·CHOH·CH₂OH in which R represents a 26 atom carbon chain, similar to that which may be obtained from D. W. Haering & Co., of Chicago, Illinois, and substitution derivatives thereof, in which the substituted radical is inorganic in character, such as the following:

Sodium glucosate:

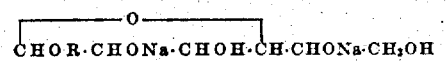
ĊHOR·CHONa·CHOH·ĊH·CHONa·CH₂OH

Sodium chrome glucosate:

ĊHOR·CHONa·CHOH·ĊH·CHOCr₂O₄Na·CH₂OH

Acid chrome glucosate:

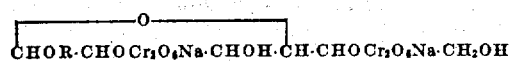
ĊHOR·CHOCr₂O₄Na·CHOH·ĊH·CHOCr₂O₄Na·CH₂OH

Sodium pyro glucosate:

ĊHOR·CHOH·CHOH·ĊH·CHOP₂O₄Na₃·CH₂OH

Sodium sulpho glucosate:

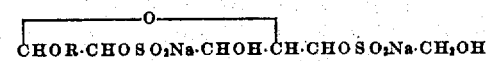
ĊHOR·CHOSO₂Na·CHOH·ĊH·CHOSO₂Na·CH₂OH

Phospho glucosate:

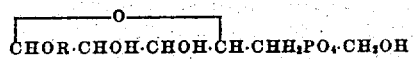
ĊHOR·CHOH·CHOH·ĊH·CHH₂PO₄·CH₂OH

Sodium hemi phospho glucosate:

ĊHOR·CHNaHPO₄·CHOH·ĊH·CHH₂PO₄·CH₂OH

Some of the above glucosates, namely sodium chrome glucosate and acid chrome glucosate, are described and discussed in an article entitled "Film inhibitors in industrial aqueous systems" by David W. Haering, Journal of Industrial and Engineering Chemistry, vol. 30, pages 1356–1361 (1938).

Other glucosate compounds may be used, as the substitution products in which potassium or ammonium is substituted for sodium, and other metal substitution products except those of the heavy metals which are electropositive to the anode metal of the dry cell, that is, those substitution products of metals which are electronegative to the anode metal may be used. The glucosate compound may contain a CrO₃ radical within itself. For example, when sodium chrome glucosate is used, this compound itself supplies a dichromate radical. In such case, a separate compound containing a CrO₃ radical need not be employed. The glucosate compound should not contain a heavy metal which is electropositive to zinc, since the presence of such a metal apparently sets up local couples with the result that there is considerable zinc corrosion. The term "glucosate compound" as used in the specification and claims contemplates the above described beta glucoside and the inorganic substitution derivatives thereof except those of a heavy metal which is electropositive to the anode metal. When a specific compound is mentioned by name, the compound of the formula set forth heretofore is intended.

The inhibiting compound may be applied to the dry cell in many ways. The glucosate compounds are colloidal substances, and may be added directly to the liquid electrolyte before it is incorporated in the dry cell, and the CrO₃ radical may be incorporated separately in the form of chromic acid or a salt of this acid which is adapted to bring the CrO₃ radical into solution in the electrolyte and make it available at the surface of the zinc anode. The glucosate compound and the compound containing the CrO₃ radical may be mixed together and added in association to the electrolyte before the latter is incorporated in the dry cell. Alternatively, the compounds, separately or in association, may be placed upon the top of the depolarizing body 14 or the electrolyte 15 after these have been incorporated in the dry cell can, when they will be absorbed by the depolarizing body or electrolyte paste and spread to the surface of the zinc can 10, where it becomes distributed uniformly and protects the entire area of the zinc which is exposed to the electrolyte.

As an alternative, the compounds may be applied by rinsing or painting the surface of the zinc anode which is to be exposed to the electrolyte with a suspension of the compounds, either separately or in association with each other, before the cell is assembled, or by dipping the anode momentarily into such a suspension.

In a well-known type of dry cell, the electrolyte layer 15 is in the form of a lining of bibulous paper pulp sheet material saturated with electrolyte suspension and arranged against the interior surface of can 10. The inhibiting compounds may be incorporated in such liquid electrolyte or they may be applied to the paper pulp sheet before or after it is saturated with the electrolyte.

The amount of the compound which should be used is not critical. Only a relatively small amount is required, depending upon the specific compounds used. In a dry cell adapted to heavy duty service, such as meter readers' flashlight service, employing a zinc can 2¼ inches high and 1¼ inches in diameter, approximately 10 to 50 milligrams of sodium chrome glucosate has been used in the electrolyte paste of each cell with satisfactory results. As another example, 30 milligrams of sodium dichromate and 10 to 50 milligrams of sodium pyro glucosate have been employed together in a similar dry cell with satisfactory results. More than this amount of the inhibiting substance may be used and, in general, more is used in cells intended for light, intermittent service than in those intended for heavy duty. An excessive quantity should not be used as this will interfere with the proper operation of the cell.

I claim:

1. In a dry cell having an electrolyte and an anode from the group consisting of magnesium, aluminum and zinc having a surface exposed to said electrolyte, means at said surface for inhibiting corrosion of said anode during inactivity of said cell, which comprises a compound from the group consisting of chromic acid and the water soluble salts of said acid in combination with a compound from the group consisting of beta glucoside and the colloidal metal glucosates of said glucoside in which the metal is electronegative to the anode metal, said beta glucoside being the compound defined herein of the formula

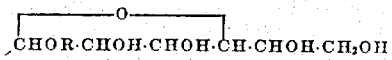
ĊHOR·CHOH·CHOH·ĊH·CHOH·CH₂OH in which R is a 26 atom carbon chain.

2. In a dry cell having an electrolyte and an anode from the group consisting of magnesium, aluminum and zinc having a surface exposed to said electrolyte, means at said surface for inhibiting corrosion of said anode during inactivity of said cell, which comprises a colloidal metal glucosate of beta glucoside in which the metal is electronegative to the anode metal, said beta glucoside being the compound defined herein having the formula

CHOR·CHOH·CHOH·CH·CHOH·CH₂OH said glucosate containing a radical from the group consisting of the chromate and dichromate radicals.

3. In a dry cell having a chloride-containing electrolyte and an anode of a metal from the group consisting of magnesium, aluminum and zinc exposed to said electrolyte, means for inhibiting corrosion of said anode during inactivity of said cell, which comprises the sodium chrome glucosate defined herein of the formula

CHOR·CHONa·CHOH·CH·CHOCr₂O₄Na·CH₂OH in which R is a 26 atom carbon chain at the surface of said anode which is exposed to said electrolyte.

4. In a dry cell having a chloride-containing electrolyte and an anode of a metal from the group consisting of magnesium, aluminum and zinc exposed to said electrolyte, means for inhibiting corrosion of said anode during inactivity of said cell, which comprises the acid chrom glucosate defined herein of the formula

CHOR·CHOCr₂O₄Na·CHOH·CH·CHOCr₂O₄Na·CH₂OH in which R is a 26 atom chain at the surface of said anode which is exposed to said electrolyte.

5. In a dry cell having a chloride-containing electrolyte and an anode of a metal from the group consisting of magnesium, aluminum and zinc having a surface exposed to said electrolyte, means at said surface for inhibiting corrosion of said anode during inactivity of said cell, which comprises a compound from the group consisting of chromic acid and the water soluble salts of chromic acid in combination with the sodium glucosate defined herein of the formula

CHOR·CHONa·CHOH·CH·CHONa·CH₂OH in which R is a 26 atom carbon chain.

HERBERT E. LAWSON.

CERTIFICATE OF CORRECTION.

Patent No. 2,343,194.  February 29, 1944.

HERBERT E. LAWSON.

It is hereby certified that error appears in the printed specification of the above numbered patent requiring correction as follows: Page 1, first column, lines 11 and 15, and second column, lines 34, 39, 44, 46 and 51, page 2, first column, lines 54 and 58, and second column, lines 1, 4 and 7, for "CrO₃" read --chromate or dichromate--; and that the said Letters Patent should be read with this correction therein that the same may conform to the record of the case in the Patent Office.

Signed and sealed this 23rd day of May, A. D. 1944.

Leslie Frazer (Seal)  Acting Commissioner of Patents.

aluminum and zinc having a surface exposed to said electrolyte, means at said surface for inhibiting corrosion of said anode during inactivity of said cell, which comprises a colloidal metal glucosate of beta glucoside in which the metal is electronegative to the anode metal, said beta glucoside being the compound defined herein having the formula

CHOR·CHOH·CHOH·CH·CHOH·CH₂OH said glucosate containing a radical from the group consisting of the chromate and dichromate radicals.

3. In a dry cell having a chloride-containing electrolyte and an anode of a metal from the group consisting of magnesium, aluminum and zinc exposed to said electrolyte, means for inhibiting corrosion of said anode during inactivity of said cell, which comprises the sodium chrome glucosate defined herein of the formula

CHOR·CHONa·CHOH·CH·CHOCr₂O₄Na·CH₂OH in which R is a 26 atom carbon chain at the surface of said anode which is exposed to said electrolyte.

4. In a dry cell having a chloride-containing electrolyte and an anode of a metal from the group consisting of magnesium, aluminum and zinc exposed to said electrolyte, means for inhibiting corrosion of said anode during inactivity of said cell, which comprises the acid chrom glucosate defined herein of the formula

CHOR·CHOCr₂O₄Na·CHOH·CH·CHOCr₂O₄Na·CH₂OH in which R is a 26 atom chain at the surface of said anode which is exposed to said electrolyte.

5. In a dry cell having a chloride-containing electrolyte and an anode of a metal from the group consisting of magnesium, aluminum and zinc having a surface exposed to said electrolyte, means at said surface for inhibiting corrosion of said anode during inactivity of said cell, which comprises a compound from the group consisting of chromic acid and the water soluble salts of chromic acid in combination with the sodium glucosate defined herein of the formula

CHOR·CHONa·CHOH·CH·CHONa·CH₂OH in which R is a 26 atom carbon chain.

HERBERT E. LAWSON.

CERTIFICATE OF CORRECTION.

Patent No. 2,343,194.  February 29, 1944.

HERBERT E. LAWSON.

It is hereby certified that error appears in the printed specification of the above numbered patent requiring correction as follows: Page 1, first column, lines 11 and 15, and second column, lines 34, 39, 44, 46 and 51, page 2, first column, lines 54 and 58, and second column, lines 1, 4 and 7, for "CrO₃" read --chromate or dichromate--; and that the said Letters Patent should be read with this correction therein that the same may conform to the record of the case in the Patent Office.

Signed and sealed this 23rd day of May, A. D. 1944.

Leslie Frazer (Seal)  Acting Commissioner of Patents.